Jan. 12, 1965 A. TAYLOR 3,165,206
STORAGE RACK FOR CYLINDRICAL CONTAINERS AND THE LIKE
Filed Sept. 16, 1963
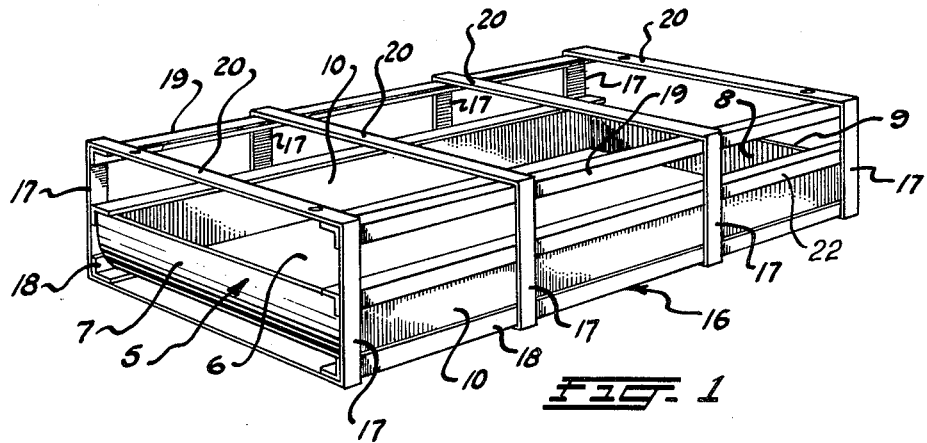
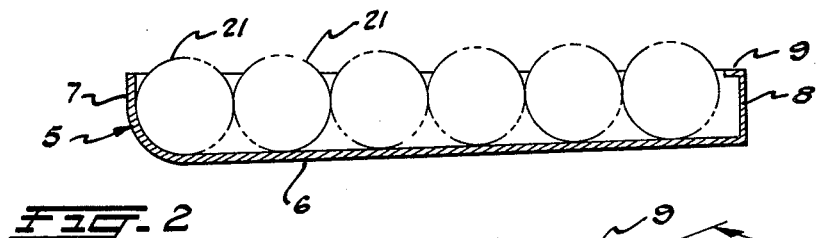
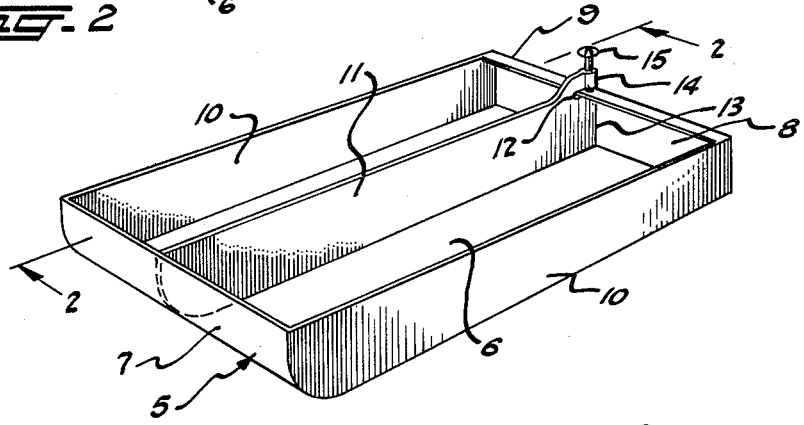
INVENTOR
ARTHUR TAYLOR

United States Patent Office 3,165,206
Patented Jan. 12, 1965

3,165,206
STORAGE RACK FOR CYLINDRICAL
CONTAINERS AND THE LIKE
Arthur Taylor, 6725 S. 7th East, Midvale, Utah
Filed Sept. 16, 1963, Ser. No. 309,096
2 Claims. (Cl. 211—126)

This invention relates to a structure used in the art of storing cylindrical containers and the like, and more particularly to a structure in the form of a rack than can be placed in kitchen cabinets of the home as well as in supporting frames of grocery stores from which one removes canned goods (containers) that should be taken out in the order in which they are placed in the rack. In other words, the first containers placed in the rack should be the first ones removed.

Unfortunately, the problem of rack design is usually left up to either the builder or the owner of the home or store and all too often this person is not one who has had very much experience in the art of storing containers which in this instance are cylindrical ones.

It is, therefore, the principal object of this invention to provide a storage rack that will automatically cause the desired container to be at the front if the structure has been properly loaded.

Another object of this invention is to provide a storage rack for cylindrical containers and the like that can be manufactured so cheaply as to permit every builder of kitchen cabinets and the like to include one or more of the racks in his cabinet when he constructs the same, thereby providing an additional attraction to the possible purchaser of the cabinet.

Another object of this invention is to provide a storage rack for cylindrical containers and the like that can be manufactured from any desired material and in any desired size and color.

Another object of this invention is to provide a storage rack for cylindrical containers and the like that can also be used for the transfer of can goods and the like from one place to another and still keep the contents in the desired order for ready use.

Still another object of this invention is to provide a storage rack for cylindrical containers and the like that does not have any pockets in which dirt and the like may fall. It is, therefore, a rack of the most sanitary nature.

The full nature of the invention will be understood from the accompanying drawing and the following description and claims.

FIGURE 1 is a perspective view of the storage rack.

FIGURE 2 is a sectional view taken substantially along line 2—2 of FIGURE 3.

FIGURE 3 is a perspective view of the cylindrical container-supporting pan of this storage rack.

Referring now to the drawing, my invention comprises a cylindrical container supporting pan 5 of this invention which is preferably rectangular when viewed from the top and which embodies a bottom 6 having one end 7 curved upward and the other end formed at right angle into a vertical end member 8 having a top and inwardly turned flange 9 as well as two equally spaced and parallel vertically disposed sides each being indicated on the drawing by the reference numeral 10. A longitudinally disposed and removable separator 11 having the same basic contour as the aforesaid sides 10 is normally located within the confines of the container supporting pan 5, as one can see on examination of FIGURE 3 of the drawing. The aforesaid separator 11 is provided with a horizontally disposed recess 12 in the upper corner of the vertically disposed end 13 which has been thickened at 14 in order to provide a vertical and internally threaded opening for the reception of the thumb screw 15 which secures the separator 11 in the desired location in the pan 5 which is normally placed within the rack portion of this invention which is characterized by the numeral 16 and which is seen on examination of FIGURE 1 of the drawing to be constructed from a plurality of equally spaced and parallel upright 17 that have their lower end fixed to the longitudinal L-shaped member 18, while the upper end of each one of the aforesaid uprights 17 is fixed to the L-shaped member 19. The central portions of uprights 17 are fixed to longitudinal L-shaped member 22. This just described construction of one side of the rack 16 is, of course, repeated on the other side, where the same reference numbers indicate like members. Both sides of the rack 16 are connected together by a plurality of equally spaced and parallel members 20 located on both the top and bottom of the rack.

It is to be understood that the above described construction of this invention can vary in both the actual shape of its members as well as their location in relation to one another. The entire invention can be constructed from metal, wood, plastic and/or a combination of any two, three or more materials as one may desire. The way in which the invention is used is so obvious to anyone who has ever handled cylindrical containers as to need no detailed explanation. However, for the sake of those people who do have a limited knowledge of this art it should be said that the cylindrical containers which are shown in phantom lines in FIGURE 2 of the drawing and which are noted by the reference number 21, are normally laid side by side in the pan 5, which is then placed in the rack portion 16 of this invention when the cylindrical containers are to be moved from one place to another. The rack portion 16 is normally constructed high enough to accommodate two of the pans 5, although only one is actually shown in FIGURE 1 of the drawing. Two or more of the storage racks can be used and placed side by side, on top of one another and/or end to end, as needed. One or more of the separators 11 may be placed within the pan 5 according to one's present needs when using this novel invention which will be of considerable value to one when clearing cabinets of can goods for remodeling of the cabinets or adjoining structures.

What I now claim as my invention and desire to secure by Letters Patent is:

1. A storage rack for cylindrical containers and the like comprising a pan that is rectangular when viewed from the top and having one end curved upward while the other end is formed vertically at right angles to the bottom of the said pan and terminating in a horizontally disposed flange and the said pan also having two equally spaced and parallel sides and one or more removable separators having the same general configuration as the said sides, with the exception of the vertically disposed end, which is provided with a horizontally disposed recess in the upper portion thereof that is thickened and provided with a vertically disposed internally threaded opening in which is screwed a thumb screw, the lower end of which presses against the upper surface of the said horizontally disposed flange which normally slips into the horizontally disposed recess in the said upper portion of the said separators when the said separators are in place in the said pan in which cylindrical containers are placed for transporting from one place to another, and a rack in which one or more of the pans are placed when the invention is being used.

2. A storage rack for cylindrical containers and the like comprising a pan that is rectangular when viewed from the top and having one end curved upward while the other end is formed vertically at right angles to the bottom of the said pan and terminating in a horizontally disposed flange and the said pan also having two equally spaced and parallel sides and one or more removable separators having the same general configuration as the said sides, with the exception of the vertically disposed end, which is provided with a horizontally disposed recess in the upper portion thereof that is thickened and provided with a vertically disposed internally threaded opening in which is screwed a thumb screw, the lower end of which presses against the upper surface of the said horizontally disposed flange which normally slips into the horizontally disposed recess in the said upper portion of the said separators when the said separators are in place in the said pan in which cylindrical containers are placed for transporting from one place to another, and a rack embodying a side consisting of a plurality of equally spaced and parallel uprights each one of which has its lower end fixed to a horizontally disposed L-shaped member and the upper end of each of the said uprights likewise secured to an alike horizontally disposed L-shaped member that is parallel to the first mentioned L-shaped member and like construction forming a second side which is in equal and parallel spaced relation to the first described side to which it is connected by a plurality of parallel and equally spaced cross-members located at both the top and bottom of each of the said uprights, and the said rack providing a holder in which one or more of the pans are placed when the invention is being used.

References Cited by the Examiner

UNITED STATES PATENTS

| | | | |
|---|---|---|---|
| 1,840,485 | 1/32 | Butler | 206—81 |
| 2,702,649 | 2/55 | Neilson | 220—18 |
| 2,891,678 | 6/59 | Levy | 211—126 |
| 2,959,298 | 11/60 | Pope | 211—126 |
| 2,989,193 | 6/61 | Smith | 211—183 |

FOREIGN PATENTS 167,878  8/21  Great Britain.

CLAUDE A. LE ROY, *Primary Examiner.*